Feb. 17, 1953 — P. G. GILBERT — 2,628,651
WHEEL FOR AUTOMOTIVE VEHICLES
Filed Jan. 3, 1951 — 2 SHEETS—SHEET 1
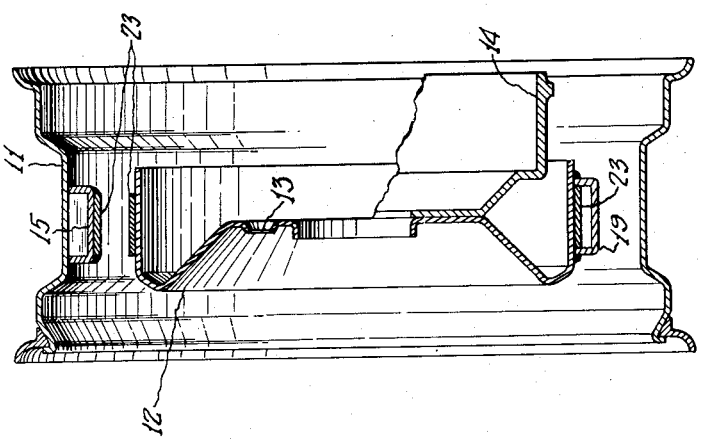
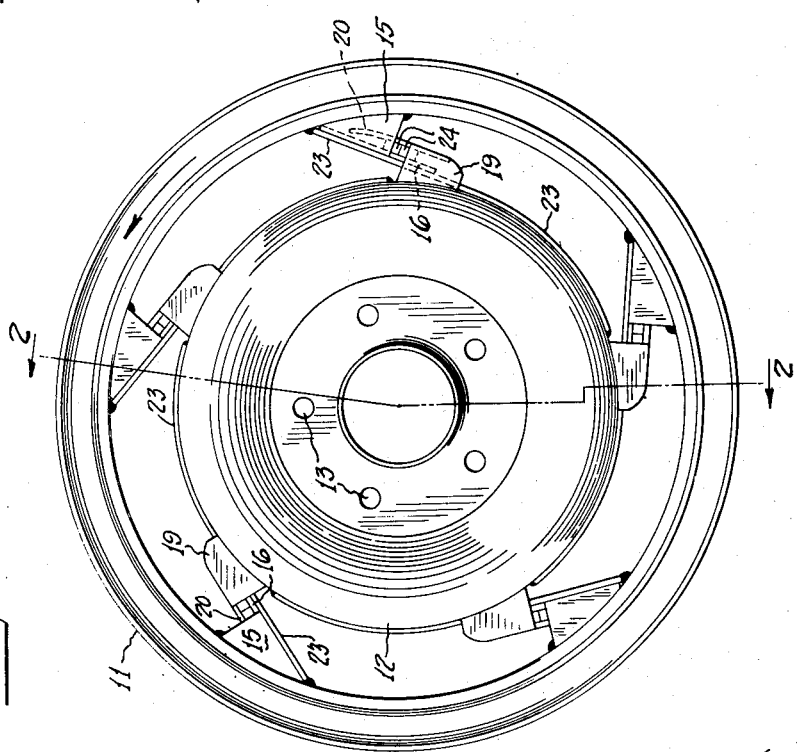
INVENTOR
PHILO G. GILBERT
BY
AGENT Feb. 17, 1953  P. G. GILBERT  2,628,651
WHEEL FOR AUTOMOTIVE VEHICLES
Filed Jan. 3, 1951  2 SHEETS—SHEET 2
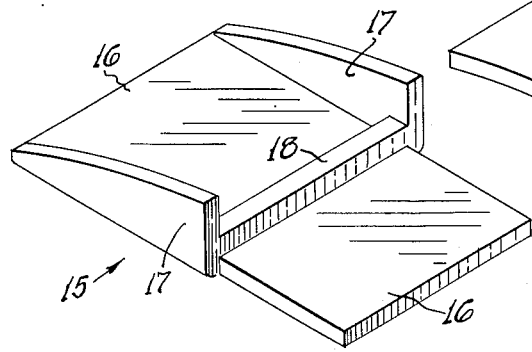
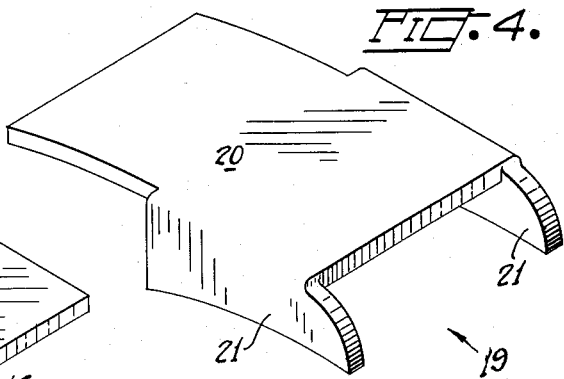
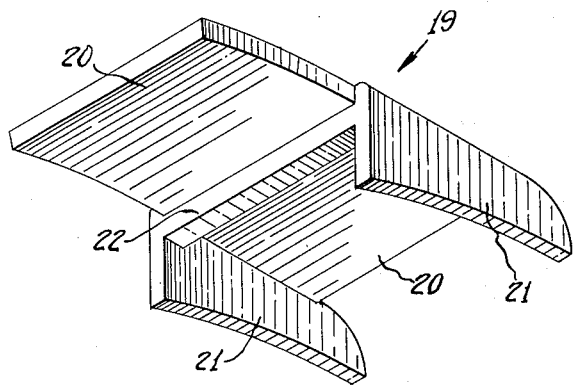
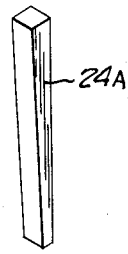
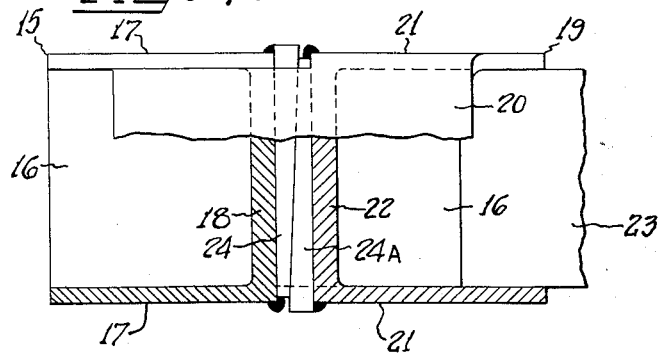
INVENTOR
PHILO G. GILBERT
BY
AGENT Patented Feb. 17, 1953

2,628,651

UNITED STATES PATENT OFFICE 2,628,651

WHEEL FOR AUTOMOTIVE VEHICLES

Philo G. Gilbert, Portland, Oreg., assignor to Gilbert Wheel, Inc., Portland, Oreg.

Application January 3, 1951, Serial No. 204,235

5 Claims. (Cl. 152—75)

This invention relates generally to wheels and particularly to wheels of the vehicle supporting type commonly used on automotive transport vehicles.

Reference is here made to my following patents and patent applications in this field.

U. S. Patent No. 2,431,802, issued December 2, 1947, on a Wheel; U. S. Patent No. 2,522,710, issued September 19, 1950, on "Wheels"; U. S. patent application, S. N. 96,454, filed June 1, 1949, on a "Wheel Rim Suspension," and U. S. patent application, S. N. 183,315, filed September 6, 1950, on a "Rim Driving Wheel."

From my earlier work I discovered that, to be safe, wheels for modern automotive vehicles must be strong and that all elements of such a wheel must be in stable equilibrium at all times. No swaying or sensible springing of the hub with respect to the rim can be tolerated. But I also found that the extremely rigid disk type wheel in common use has inherent disadvantages when used with the relatively elastic pneumatic tires commonly used with them.

In such a wheel and tire combination it is apparent that, due to the deformation of the tire caused by the weight of the vehicle on the wheel, the length of the tread or the circumference of the tire is greater than the circumference of a circle whose radius is the distance from the center of rotation of the wheel to the road surface. When the vehicle moves ahead, the part of the tread just coming into contact with the road surface is compressed circumferentially and lays behind its normal position relative to the wheel. Somewhere in its area of contact with the road surface the tire tread must catch up in angular position with the tire side walls and this can only be accomplished in an action accompanied by slipping and scuffing of the tread on the supporting surface. Much of the usual tire wear on dry pavement and slipping or skidding of wheels when the pavement is wet is due to this working of the tire tread in contact with the road surface, which not only causes imperfect traction but also uses up motive power due to inefficient wheel operation.

With the common type of rigid wheel this inefficient operation is aggravated by the direct downward loading of the tire under the axle.

Many full scale tests of the type of wheel shown in my patent application, S. N. 96,454, have proved by substantial fuel savings, greater braking traction, and less tire wear, that a wheel of the type there illustrated, when dynamically loaded in forward motion, shifts the dynamic load center of the wheel ahead of the geometric center of the wheel and thereby shifts forward of the axle the area of greatest loading on the tire and road surface. The functional operation of the wheel has been all that could be desired but, in this earlier type of wheel, the concentration of stresses at fulcrum points of the rim suspension has resulted in some wear on the elements of the suspension.

While it is, therefore, the principal object of this present invention to provide a vehicle wheel for automotive transport service which, in the dynamic loading of the wheel during the forward motion of the vehicle, will shift the load center of the wheel to some point ahead of the wheel axis for the purpose of causing the wheel to climb more easily over the irregularities of the road surface, to give more reliable braking traction to the tire tread on the road surface, and to reduce the wear and scuffing of the tire as it contacts the road surface, it is also a prime object of this invention to provide such a wheel which is sensibly rigid and capable of maintaining sensibly its geometric concentricity of hub and rim without having built into it any points of destructive stress concentration.

How these and other objects are attained are made clear in the following description referring to the accompanying drawings, in which Fig. 1 is a view in side elevation of the wheel of my present invention.

Fig. 2 is a section of my wheel viewed along the line 2—2 of Fig. 1 and showing fragmentarily the attached brake drum which is an incidental part of the wheel.

Fig. 3 is a perspective view of one of the rim suspension clip elements of my invention.

Fig. 4 is an outer perspective view of one of the hub suspension clip elements of my invention.

Fig. 5 is an inner view in perspective of the hub clip of Fig. 4.

Fig. 6 is a perspective view of one of the two identical tapered keys used in the assembly of each of the suspension units of one of my wheels.

Fig. 7 is an outer plan view in partial section showing the keyed assembly of the rim clip to the hub clip of one of the suspension units of one of my wheels.

In the various figures of the drawing like numerals refer to like parts.

Now referring to the drawings there is shown the wheel of my invention having a rim 11 adapted to carry a pneumatic tire of the type used with wheels for automotive transport vehicles. Also is shown a wheel hub 12 having holes 13 formed therein for bolt attachment of the wheel hub to the wheel carrying hub of an automotive transport vehicle in a manner well known in the art. Brake drum 14 is secured to wheel hub 12 in the usual manner.

As indicated by the solid black welding symbols on the drawings, U-shaped rim clips 15 having base members 16 and outwardly extending leg members 17 are equally spaced and secured to the inside of rim 11. Base members 16 of clips 15 are longer than leg members 17.

Formed together with base member 16 and legs 17 at the point of extension of base 16 from legs 17 is abutment element 18 as clearly shown in Fig. 3.

U-shaped hub clips 19 having base elements 20 and inwardly extending leg elements 21 are equally spaced and secured to the outside of hub 12 by welding. Base elements 20 of clips 19 are longer than leg elements 21. Formed together with base elements 20 and leg elements 21 at the point of extension of base element 20 from leg elements 21 is abutment element 22, as shown clearly in Fig. 5.

Having one end wrapped on hub 12 and welded thereto, suspension straps 23 each extends through one of the hub clips 19 and has its other end securely welded to one of the rim clips 15 and to rim 11.

Wedged between the abutment 18 and the abutment 22 of each set of clips 15 and 19 are two tapered keys 24 and 24A, each driven in place to a pre-set tension of strap 23. Then the keys are cut off and welded securely in place at their ends as shown in Fig. 7. Tapered key 24 abutting abutment 18 is welded to clip 15 and tapered key 24A abutting abutment 22 is welded to clip 19. It should be noted that in assembly when straps 23 are being welded to hub 12 and rim 17, abutments 18 and 22 are temporarily spaced by spacing blocks (not shown) so that abutments 18 and 22 will be spaced properly for keys 24 and 24A to be capable of being driven into place in final assembly to give the desired pre-loading stress to straps 23. A feature of this design of my wheel is the ability to prestress, or pre-load, straps 23 so that there will be no sensible displacement of rim 11 with respect to hub 12 in actual operation. Lateral or axial movement of hub 12 with respect to rim 11 is prevented by the extreme axial or width rigidity of straps 23 securely welded to rim 11, hub 12, and clips 15 and closely guided between legs 21 of clips 19.

In operation, since the forward motion of the wheel is to the left or counter-clockwise in Fig. 1, it is apparent that the load on the hub is transmitted to the rim on the forward side of the wheel through clips 19, keys 24 and 24A, and clips 15, while on the backward side of the wheel the load on the hub is transmitted to the rim through tension stressing of straps 23.

In static equilibrium, as when the loaded wheel rests on a flat surface and no forward or rearward forces are acting on it, the hub is uniformly suspended in the rim, but when forward motion torque is applied to the hub of a driving wheel or a forward pushing force is applied to the hub of a front or non-driving wheel, it is suggested that the resulting turning force applied to the rim is applied substantially tangentially by the suspension units and that the greater portion of the total turning effort applied to the rim is applied downwardly on the forward half of the wheel through direct contact of keys 24 and 24A with abutments 18 and 22. The turning or forward moving forces add to the compressive stresses applied to keys and abutments on the forward side of the wheel and the resultant of the forward forces is directed generally downward.

On the rearward side of the wheel the turning or forward movement forces are upward, tending to relieve the vehicle weight loading stresses on the straps 23 on that part of the wheel.

It is, therefore, seen that in its forward motion my wheel has a tendency to concentrate the transfer of pressure applied by the wheel hub on the wheel rim on the forward side of the wheel or, in other words, to shift the center of dynamic loading ahead of the axle and therefore apply the vehicle load to the road surface ahead of a point directly under the axle. It might even be said that the wheel hub tends to walk up the rim step by step as though the rim were a tread mill. The result is a definite increase in wheel efficiency as evidenced in actual test by a saving in fuel, less tire wear, and greater ease in traversing the irregularities of the road surface.

Having explained the construction of the form of my wheel shown in the drawings and its mode of operation as well as its novelty and utility, I claim:

1. A wheel comprising a hub structure having a cylindrical outer surface, an encircling rim structure uniformly radially spaced from said hub structure, and a multiplicity of rim suspension units angularly equally spaced about said hub structure between said hub structure and said rim structure, each of said units comprising a strap secured at one end to said hub structure and at the other end to said rim structure, said strap being wrapped on said cylindrical outer surface of said hub structure for a part of the circumference of said hub structure and extended tangentially from said cylindrical outer surface of said hub structure to said rim structure, a driving clip secured on said hub structure, a driven clip secured on said rim structure, each of said clips having an abutment surface perpendicular to said strap, and a pair of oppositely bevelled wedges strained between said abutment surfaces of said clips, whereby each of said straps will be tensilely strained from said rim structure tangentially to said hub structure.

2. The wheel structure of claim 1 including means securing said wedges permanently in their strained positions between said abutment surfaces.

3. The wheel structure of claim 1 characterized in that each of said straps is surrounded by said outer surface of said hub structure and by one of said driving clips on said hub structure whereby said straps will be restrained from axial movement with respect to said hub structure.

4. A supporting wheel for an automotive transport vehicle comprising a hub structure and an encircling rim structure uniformly radially spaced from said hub structure, together with three or more suspension units equally spaced about said hub structure securing said hub structure to said rim structure, each of said units comprising a tension member strained tangentially of said hub structure between said hub structure and said rim structure and a compression member including a pair of oppositely bevelled wedges strained between said hub structure and said rim structure parallel to said tension member whereby when said wheel is urged to roll in one direction on a supporting surface by a force applied to said hub structure the rotating force applied by said hub structure to said rim structure will be concentrated in said compression members on the forward side of said wheel.

5. A supporting wheel for an automotive transport vehicle comprising a hub-structure and an encircling rim structure uniformly radially spaced from said hub structure, together with three or more suspension units equally spaced about said hub structure securing said hub structure to said rim structure, each of said units comprising a tension member strained tangentially of said hub structure between said hub structure and said rim structure, and compression means strained between said hub structure and said rim structure substantially parallel to said tension member, said compression means being adapted to maintain said tension member strained in its position between said hub structure and said rim structure.

PHILO G. GILBERT.

REFERENCES CITED

The following references are of record in the file of this patent:

UNITED STATES PATENTS

| Number | Name | Date |
|---|---|---|
| 2,170,666 | Sinclair | Aug. 22, 1939 |